United States Patent [19]

Schulman

[11] 3,979,975
[45] Sept. 14, 1976

[54] INDEXING CLUTCH MECHANISM
[75] Inventor: David A. Schulman, Hopkins, Minn.
[73] Assignee: Possis Corporation, Minneapolis, Minn.
[22] Filed: July 2, 1975
[21] Appl. No.: 592,618

[52] U.S. Cl. .............................. 74/815; 74/125.5; 74/575; 192/12 BA; 192/26; 192/33 C
[51] Int. Cl.² ......................................... F16D 71/04
[58] Field of Search ............... 192/12 BA, 26, 33 R, 192/33 C; 74/815, 113, 125.5, 575, 577 S

[56] References Cited
UNITED STATES PATENTS

| | | | |
|---|---|---|---|
| 2,565,787 | 8/1951 | Tennant | 74/815 X |
| 2,633,777 | 4/1953 | Hoern | 74/815 X |
| 2,985,038 | 5/1961 | Tandler et al. | 74/815 |
| 3,336,823 | 8/1967 | Bonzi | 74/815 X |
| 3,522,912 | 8/1970 | Moore | 242/7.05 |
| 3,524,601 | 8/1970 | Biddison et al. | 242/7.03 |
| 3,559,781 | 2/1971 | Brunelle | 192/12 BA |
| 3,636,621 | 1/1972 | Dammar | 29/596 |
| 3,673,878 | 7/1972 | Biddison | 74/125.5 |
| 3,739,660 | 6/1973 | Schubert | 74/815 |
| 3,785,583 | 1/1974 | Biddison | 242/7.05 B |
| 3,818,570 | 6/1974 | Del Bono | 29/205 C |
| 3,913,220 | 10/1975 | Miller | 29/597 |

*Primary Examiner*—Allan D. Herrmann
*Attorney, Agent, or Firm*—Burd, Braddock & Bartz

[57] ABSTRACT

An armature winding machine having an indexing mechanism for indexing the armature. The indexing mechanism includes an indexing clutch driven by an electric motor. A gear drive connects the clutch to the holding structure for the armature. The indexing clutch has a control collar that is selectively engaged with a plurality of pawls operable to stop the control collar at predetermined precise rotational positions. The positions of the pawls relative to the control collar are individually adjustable on a support providing for selective adjustment of the indexing positions of the clutch.

46 Claims, 5 Drawing Figures

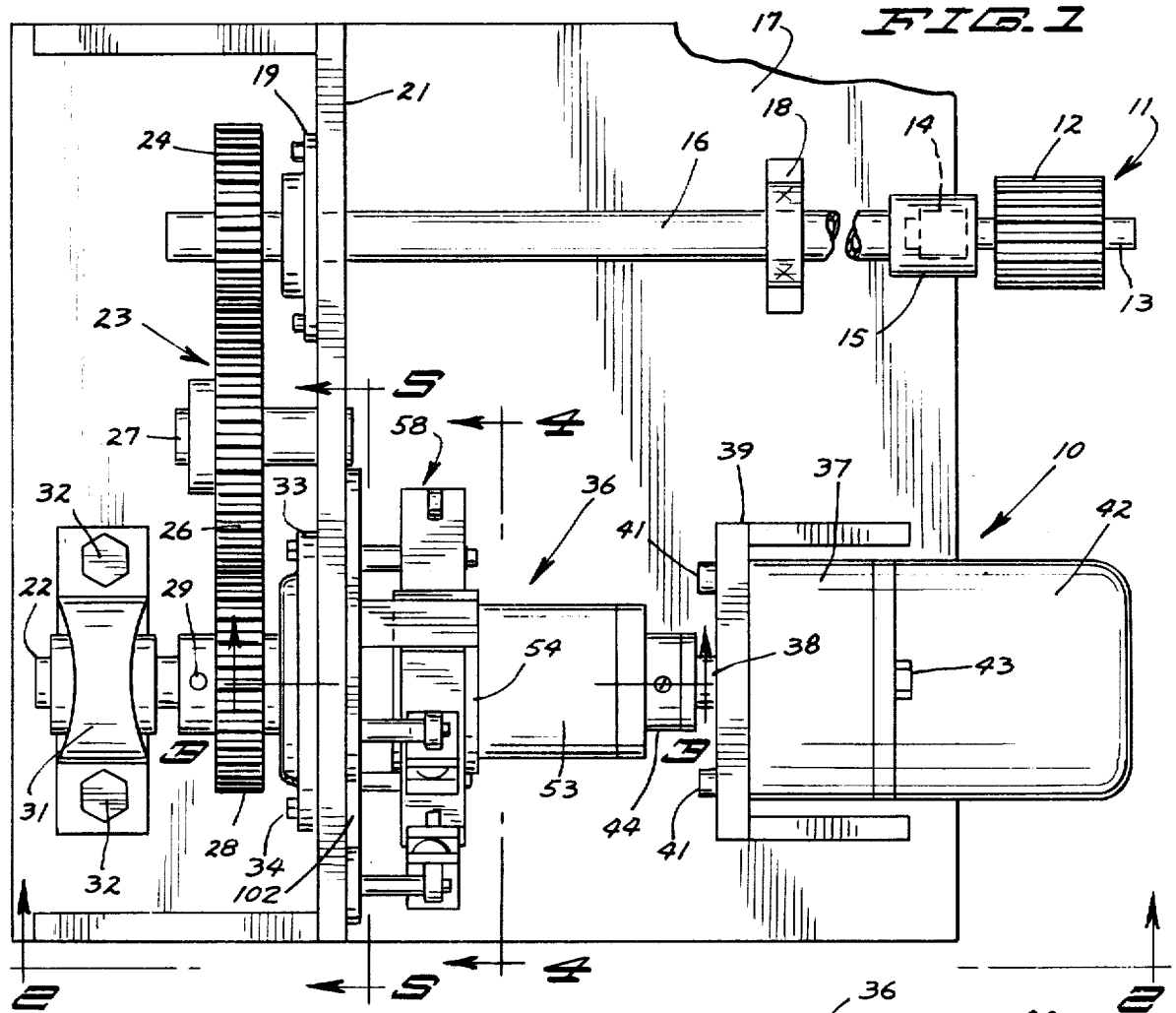
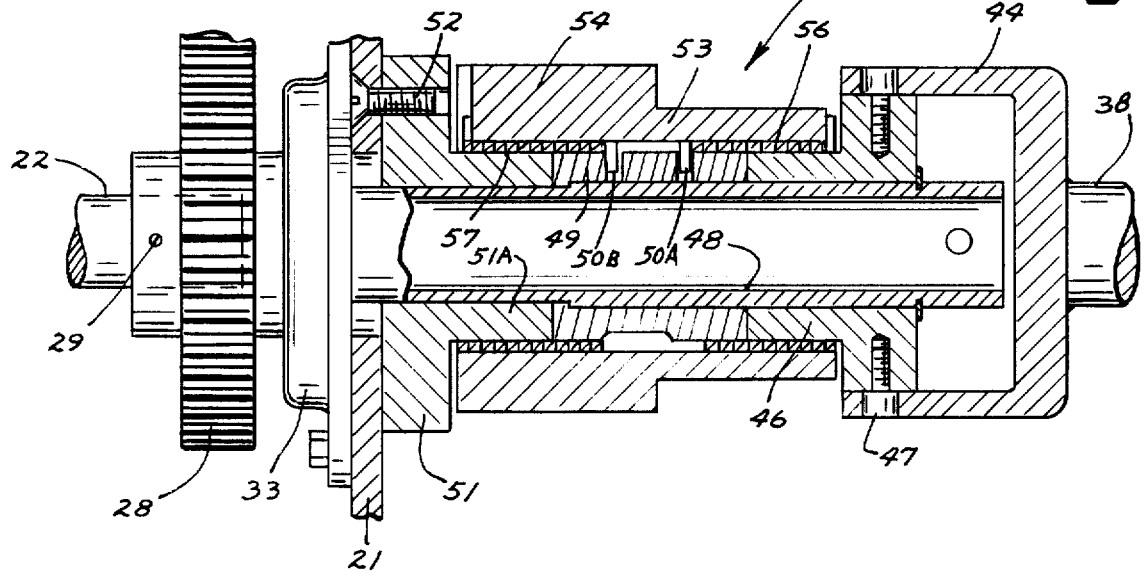

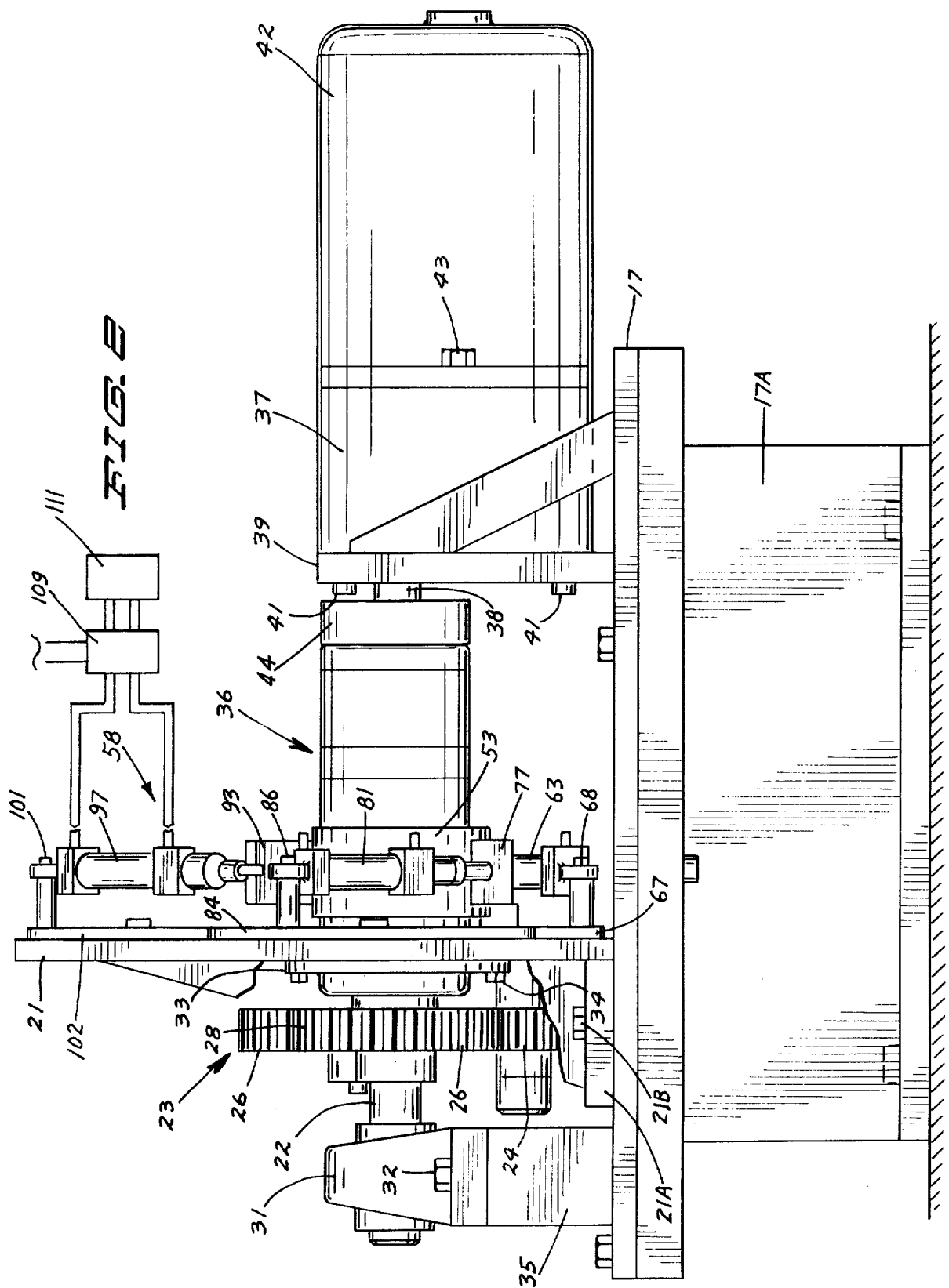

INDEXING CLUTCH MECHANISM

BACKGROUND OF INVENTION

Positive stop clutch mechanisms are used to stop a clutch output at a predetermined rotational position. An example of a clutch brake having a positive output position selection is disclosed by Weatherby in U.S. Pat. No. 3,521,730. Clutches of this type have one or more stopping shoulders on a control sleeve. These shoulders are sequentially engaged with movable arms or pawls to stop the clutch output member in fixed positions. This type of clutching mechanism has limitations when used with an armature winding machine. The stops on the clutch control member are not adjustable and thereby preclude adjustment of the indexing position of the armature. Also, the rotational speed of the control member is limited by the speed with which the stopping arms can be retracted to allow the control member to rotate and return to catch the next stopping position. If the control member is rotated too quickly, the pawl will return too slowly to catch the next indexed stop.

SUMMARY OF THE INVENTION

The invention is broadly related to an apparatus for indexing an object to selected desired positions. More particularly, the apparatus is used for indexing an armature in an armature winding machine. The apparatus has a clutch mechanism driven by a motor. The clutch mechanism is connected through power transmitting means to the armature whereby operation of the clutch mechanism will index the armature. The clutch mechanism has a control member which is held is selected fixed positions to release the clutch mechanism and thereby hold the armature in a selected indexed position. Actuator means are selectively engageable with the control member to hold the control member in selected fixed positions. The actuator means are mounted on means that can be adjusted so that the position of the actuator means relative to the control member is adjustable and thereby adjust the selected fixed positions in which the control member is held. The actuator means are preferably a plurality of pivoting pawls having stop portions which selectively engage a stop projection or tooth of the rotating control member of the clutch. Separate power means, as fluid cylinders, are operable to selectively move the pawls into a position where they can selectively and sequentially engage the tooth of the clutch control member. The pawls are mounted on adjustable plate members. The plate members are attached to a fixed support and can be angularly adjusted so that the position of the pawl relative to the control member can be changed and thereby change the fixed stop position of the clutch. One of the pawls is provided with a tooth having a rearwardly directed face engageable with a tooth of the control member. The adjacent pawl has a forwardly directed face engageable with a tooth of the control member. This permits very little rotation of the clutch control member to provide a small incremental indexing movement.

An object of the invention is to provide a clutch apparatus operable to accurately start and stop a load driven by a continuously rotating power source in several positions. Another object of the invention is to provide an indexing clutch with a plurality of actuators that are operable to selectively hold and release the indexing clutch at selected rotational positions. A further object of the invention is to provide an indexing clutch with a plurality of actuators that are independently adjustable to change several indexing release positions of the clutch. Yet another object of the invention is to provide an indexing apparatus that is capable of rapid and accurate cycling over an extended period of time, is rugged in construction and reliable in use. A still further object of the invention is to provide an indexing clutch operable to index the core of an armature one revolution plus one slot or one revolution minus one slot. Yet another object of the invention is to provide an actuator means for a clutch having a rotating control member which is operable to permit the clutch to perform rapid and small incremental rotational output power movements. These and other objects and advantages of the invention are embodied in the following detailed description of the invention.

IN THE DRAWINGS

FIG. 1 is a top plan view of an armature indexing mechanism having the indexing clutch apparatus of the invention;

FIG. 2 is a side elevational view taken along line 2—2 of FIG. 1;

FIG. 3 is an enlarged sectional view taken along line 3—3 of FIG. 1;

DESCRIPTION OF PREFERRED EMBODIMENT

Figure 4:
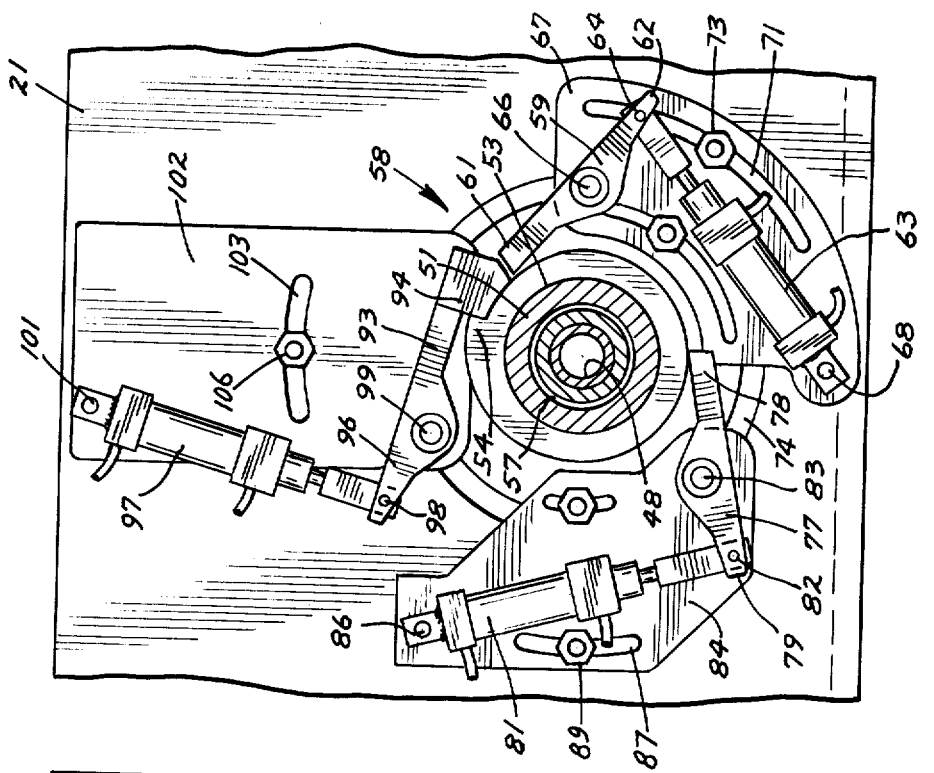
FIG. 4 is an enlarged sectional view taken along line 4—4 of FIG. 1.

Referring to the drawing, there is shown in FIG. 1, an indexing apparatus indicated generally at 10 for indexing an armature 11 having a slotted core 12 adapted to receive coils or wire. The wire is wound onto the core with a wire winding apparatus (not shown). The wire winding apparatus can be the armature winding machine shown in U.S. Pat. application Ser. No. 557,363 filed Mar. 11, 1975. Other types of armature winding machines, as shown in U.S. Pat. No. 3,636,621 and No. 3,818,570, can be used to wind coils of wire onto the armature core 12.

The armature 11 has a shaft 13 carrying a slotted core 12 and a commutator 14. Armature shaft 13 is positioned in a holder 15 having a collet to support the armature 11 in a horizontal position. The holder 15 is mounted on an elongated tubular shaft 16 positioned over a generally horizontal table or support 17. A frame 17A supports table 17 at a selected elevation. A first bearing 18 rotatably mounts the armature end of shaft 16 on the table 17. A second bearing 19 secured to an upright plate 21 supports the opposite end of shaft 16 on table 17. Plate or upright support 21 is secured to a base plate 21A attached to table 17 with bolts 21B, as shown in FIG. 2.

A second shaft 22 is connected with a gear drive transmission indicated generally at 23 to shaft 16. The gear drive transmission 23 comprises a plurality of change gears that include a spur gear 24 mounted on the end of shaft 16. An idler spur gear 26 rotatably mounted on axle 27 is in driving engagement with gear 24. Axle 27 is mounted on the wall 21. A third drive spur gear 28 rotatatably connected with the shaft 22 with a drive pin 29 is in driving engagement with gear 26. On rotation of gear 28, the gears 24 and 26 are rotated and thereby rotate shaft 16. One revolution of indexing clutch 36 causes gear 28 to make one revolution. Gear 24 has one more or one less tooth than gear 28, so gear 24 and armature 12 rotate an amount equal to the ratio of the number of teeth on gear 24 to the number of teeth on gear 28. For example, with gear 28 provided with 31 teeth and gear 24 provided with 32 teeth, one revolution of gear 28 causes gear 24 to rotate 31 teeth, or 1 gear tooth less than a complete revolution of the armature shaft. A 32 slot armature will index 31 slots each time clutch 36 indexes one revolution. When gear 28 has 33 teeth and gear 24 has 32 teeth, each revolution of clutch 36 causes a 32 slot armature to index one slot more than one full revolution of the armature. In this manner, armature 11 is indexed to a selected circumferential position for receiving coils of wire.

Shaft 22 is rotatably mounted in a bearing assembly 31. Bolts 32 secure bearing assembly 31 to a stand 35 connected to table 17. A second bearing 33 mounted on the wall 21 with bolts 34 is located between gear 28 and wall 21. The bearing 33 supports a portion of the indexing clutch indicated generally at 36. Other types of rotatable support structures can be used to support shaft 22.

Referring to FIGS. 1 and 2, a speed reducer or gear box 37 having an output drive shaft 38 is mounted on a support 39. Support 39 is secured to table 17. A plurality of bolts 41 secure the speed reducer 37 to support 39. An electric motor 42 is mounted on the outer end of speed reducer 37 and is secured thereto with a plurality of bolts 43. A slow speed motor can be directly connected to drive shaft 38 thereby eliminating the need for gear box 39.

The details of the indexing clutch 36 are shown in FIG. 3. Indexing clutch 36 has an input member or sleeve 46 attached to a cup-shaped member 44 with a plurality of bolts 47. Other types of connecting structure can be used to drivably secure shaft 38 to sleeve 46. The cup-shaped member 44 is secured to drive shaft 38 of speed reducer 37. The input sleeve 46 is rotatably mounted on a tubular output shaft 48. Shaft 48 extends through an opening in wall 21 and is secured to shaft 22. The gear 28 is fixed with a pin or key to the shaft 48 so that rotation of shaft 48 will rotate gear 28. A brake hub 51 is secured to the wall 21 with bolts 52.

A control member or collar 53 is located between hub 44 and hub 51 and extends around the output sleeve 49 and the portions of the input sleeve 46 and hub 51 that are coextensive with sleeve 49. Sleeve 49 is fixed to shaft 48. The control collar 53 has an upwardly and outwardly directed stop projection or tooth 54 adapted to engage an actuator means 58 to stop the rotation of the control collar 53 and fix the rotation position of the collar. Collar 53 has have a number of stop projections. A drive coil spring 56 extends about a portion of sleeve 49 and the input sleeve 46. One end of the coil spring 56 extends into a hole 50A in sleeve 49. The opposite end of spring 56 extends upwardly into a groove in the end of control collar 53. A brake coil spring 57 is located about the portion of sleeve 49 and the cylindrical portion 51A of the brake hub 51. Spring 57 has an end that extends down into a hole 50B in sleeve 49. The opposite end of spring 57 extends upwardly into a groove in the side of control collar 53. The clutch can be constructed according to the clutch brake shown in U.S. Pat. No. 3,521,730. Alternatively, the clutch can be an incremental rotation control package Model CB-6 sold by the Warner Electric Brake and Clutch Company of Pitman, New Jersey.

As shown in FIG. 4, a plurality of actuators or actuator means indicated generally at 58 operate to selectively stop the control member 53 in a number of fixed circumferential fixed positions and thereby release the drive action of the clutch. In operation, input sleeve 46 is free to turn at all times in response to the rotation of hub 44 though the operation of the speed reducer 37. When the holding actuator means 58 is released, control collar 53 is released, allowing drive spring 56 to wrap around output sleeve 49, thus driving sleeve 49 and shaft 48 secured to sleeve 49. The rotating collar 53 releases brake spring 57.

When actuator menas 58 is moved to the hold position, it engages the tooth 54 thereby stopping rotation of control member 53. The fixed control collar 53 opens drive spring 56, disconnecting fixed output sleeve 49. Simultaneously, collar 53 also engages brake spring 57, wrapping it down on the output sleeve 49 and the brake hub 51A. Within milliseconds, brake spring 57 is fully wrapped down on both the sleeve 49 and the brake hub 51A and thereby prevents overrunning due to low inertia. The clutch 36 in a single, compact unit that functions to accurately start and stop the rotation of shaft 16 and thereby index armature core 12.

Referring to FIG. 4, actuators means 58 comprise a first pivotal pawl 59 having a holding end 61 and a motor end 62. A fluid motor 63, as a double acting air cylinder, is pivotally connected with a pin 64 to end 62. The midportion of pawl 59 is pivotally mounted on pivot pin 66. Pin 66 is secured to an adjustable support plate 67. An anchor pin 68 pivotally connects fluid motor 63 to the support plate 67.

Figure 5:
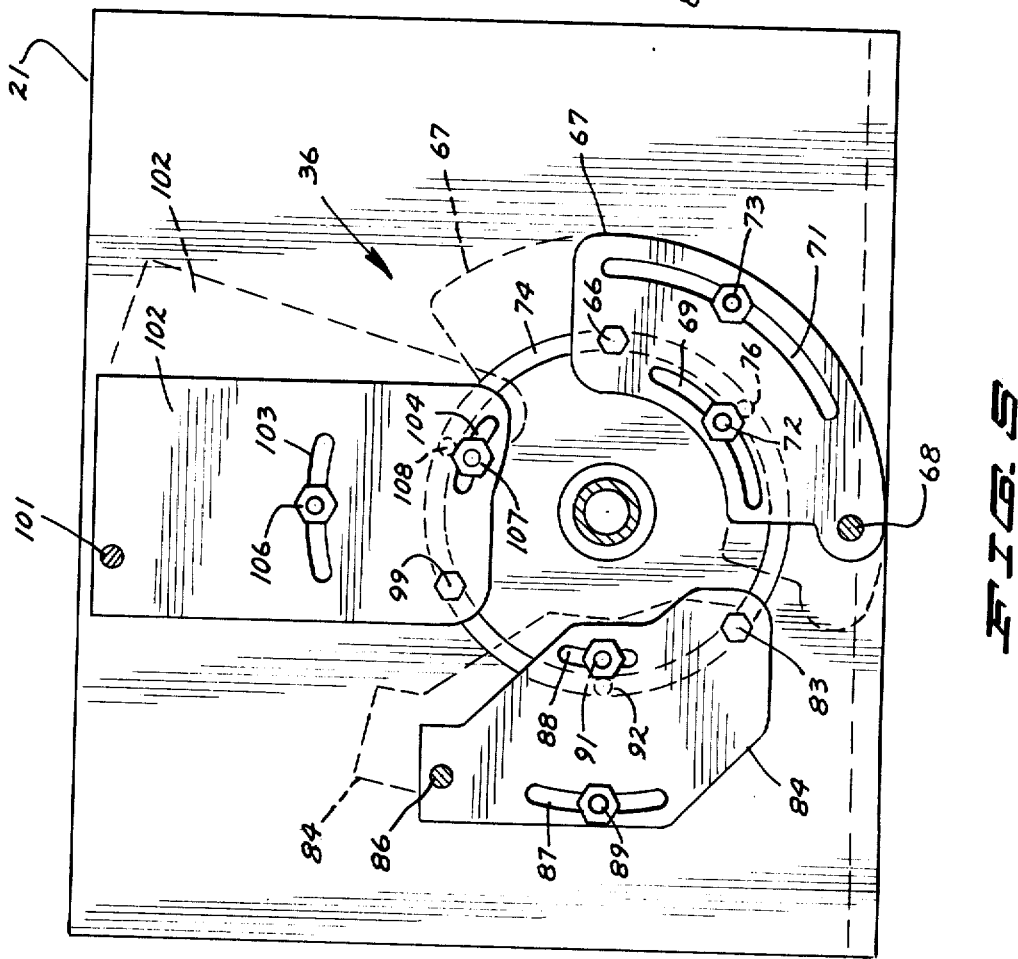
FIG. 5 is an enlarged sectional view taken along line 5—5 of FIG. 1.

As shown in FIG. 5, support plate 67 has a pair of arcuate slots 69 and 71. A pair of bolts 72 and 73 extend through slots 69 and 71, respectively, to secure the plate 67 to the wall 21. The wall 21 has a circular groove 74 surrounding the opening for the clutch output members. The plate 67 has a guide pin 76 extended into the groove 74 so that the angular or circumferential position of the plate 67 can be adjusted. This circumferential adjustment of plate 67 positions the pawl 59 relative to the control collar 53 so that the stopping position of the collar 53 can be adjusted.

Returning to FIG. 4, the actuator means 58 includes a second pivoting pawl 77 having a holding end 78 adapted to engage tooth 54 and a motor or control end 79. A fluid motor 81, as a double-acting air cylinder, is connected with pin 82 to end 79. The midportion of pawl 77 is rotatably mounted on a pivot pin 83. Pivot pin 83 is secured to a support plate 84. The fluid motor 81 is mounted on an anchor pin 86. Anchor pin 86 is also secured to the support plate 84.

As shown in FIG. 5, support plate 84 has a pair of arcuate slots 87 and 88. A pair of bolts 89 and 91 extend through slots 87 and 88, respectively, to secure the plate 84 to wall 21. A guide pin 92 secured to plate 84 extends into the circular groove 79 to guide the arcuate position of the plate 84. The plate 84 is circumferentially movable a distance determined by the length of slots 87 and 88 and thereby circumferentially position the second pawl 77 relative to the control collar 53.

Actuator means 58, shown in FIG. 4, includes a third holding pawl 93 located between pawls 59 and 77. Pawl 93 has a downwardly directed or radially inwardly directed tooth or holding end 94 adapted to engage the tooth 54 to hold the collar 53 in a fixed circumferential postion. Tooth 94 is located adjacent end 61 of pawl 59. This permits the control collar 53 to be rotated a short distance by releasing pawl 93 and permitting pawl 59 to stop control collar 53. Control collar 53 can be stopped after moving at least 15°. Pawl 93 has a motor end 96 connected to a fluid motor 97, as a double-acting air cylinder, with a pivot pin 98. The midportion of pawl 93 is rotatably mounted on a pivot pin 99. The motor 97 is mounted on an anchor pin 101. Pins 99 and 101 are secured to an adjustable support plate 102 mounted on wall 21.

As shown in FIG. 5, plate 102 has a pair of arcuate slots 103 and 104. A pair of bolts 106 and 107 extend through slots 103 and 104 and secure the plate 102 to the wall 21. A guide pin 108 secured to plate 102 projects into the circular groove 74 to control the circumferential position of the plate 102. As shown in broken lines in FIG. 5, the plate 102 is arcuately or circumferentially adjustable and thereby changes the circumferential position of the holding pawl 93 relative to collar 53. Plate 102 is adjustable independently of plates 67 and 84 so that the stop position of the control member 53, determined by pawl 93, can be adjusted independently of the stop positions determined by paws 59 and 77. In like manner, the circumferential positions of the pawls 59 and 77 can be adjusted relative to each other and relative to pawl 93 whereby the stop positions of the control collar 53 can be independently adjusted. In other words, one pawl can be adjusted relative to control member 53 without altering the adjustment of the remainder of the pawls.

The fluid motors 63, 81 and 97 are double-acting air cylinders that are controlled by air under pressure. As shown in FIG. 2, a control unit 109, as a solenoid valve, is connected to opposite ends of fluid motor 97. A fluid pressure source 111, such as a pump or air supply, is connected to control unit 109. The control unit 109 is electrically coupled to an electrical control structure for the armature winding machine. Each fluid motor has a separate solenoid valve that is electrically connected to the electrical control for the machine. The solenoid valves are operated in a predetermined sequence in accordance with the desired indexing positions of the armature. Referring to FIG. 4, the tooth 94 of pawl 93 is in engagement with the stop projection 54 of the collar or control member 53. On actuation of fluid motor 97, the tooth 94 will move away from projection 54. Collar 53 will rotate until tooth 54 engages the end 61 of pawl 59. This provides for a small incremental rotation of the collar 53 with a resultant small incremental rotation of the armature 11. The rotation can be as little as 15 degrees, or the equivalent of one slot of the armature. The pawl 59 can be released by the actuation of the fluid motor 63. The collar 53 will then rotate until the stop projection 54 engages the end 78 of pawl 77. The pawl 77 can be held in a release position whereby the sleeve 53 will rotate until it engages either tooth 94 or end 61 of pawls 93 and 59, respectively. When sleeve 53 rotates from the stop position one revolution, as shown in FIG. 4, and engages tooth 94 of pawl 93, armature 11 rotates one revolution plus one slot of the armature core. Armature 11 can rotate one slot less than one revolution by changing the teeth ratio between gears 24 and 28. The pawl 77 is used to stop control member 53 approximately 180° from the stop position determined by tooth 94. It is apparent that additional pivoting pawls can be used to stop the control member 53 is additional fixed positons.

While there has been shown and described and shown a preferred embodiment of the invention, it is understood that changes in the structure and structural relationships, materials, and drive mechanisms can be used by those skilled in the art without departing from the invention. The invention is defined in the following claims.

The embodiments of the invention in which an exclusive property or privilege is claimed are defined as follows:

1. An apparatus for indexing an armature comprising: a clutch mechanism, drive means for transmitting power to the clutch mechanism, means for holding an armature in a selected rotational position, power transmitting means drivably connecting the clutch mechanism to the means for holding the armature whereby operation of the clutch mechanism will rotate the armature to a selected position, said clutch mechanism having a control member which can be held in selected fixed positions to release the drive of the clutch mechanism to thereby hold the armature in selected positions, actuator means movable to a first position into engagement with the control member to hold the control member in selected fixed positions and movable to a second position out of engagement with the control member whereby the clutch mechanism transmits power from the drive means to the power transmitting means, support means for supporting the actuator means, said support means being movable to selected adjusted positions, and means for adjusting the position of the support means relative to the control member to adjust the location of the actuator means relative to the control member thereby adjusting the selected fixed position in which the control member is held.

2. The apparatus of claim 1 wherein: the actuator means includes a movable member engageable with the control member, means mounting the movable member on the support means, and power means operable to selectively move the movable member into and out of engagement with the control member.

3. The apparatus of claim 1 wherein: the actuator means includes a plurality of pawls engageable with the control member, pivot means pivotally mounting the pawls on the support means, and power means operable to selectively pivot the pawls into and out of engagement with the control member.

4. The apparatus of claim 3 wherein: the support means includes plate means for supporting the pivot means and power means, and said means for adjusting the position of the support means is operable to adjust the position of the plate means whereby the positions of the pawls are adjusted relative to the control member.

5. The apparatus of claim 4 including: a stationary support, said means for adjusting the position of the plate means including releasable connecting means attaching the plate means to the support.

6. The apparatus of claim 5 wherein: the support has a groove, said plate means having a projection extended into the groove to position the plate means on the support.

7. The apparatus of claim 1 wherein: the actuator means includes three pivotally movable pawls engageable with the control member to hold the control member in selected fixed positions, pivot pins mounted on the support means supporting the pawls, separate power means connected to the pawls, said support means including separate plate means carrying the pivot pins and power means, and means for adjusting the positions of each plate means whereby the positions of the pawls are adjusted relative to the control member so that the control member can be stopped at selected fixed positions.

8. The apparatus of claim 7 including: a stationary support, said means for adjusting the position of each plate means including releasable connecting means attaching the plate means to the support.

9. The apparatus of claim 8 wherein: the support has a groove, each plate means having a projection extended in the groove to position each plate means on the support.

10. The apparatus of claim 1 wherein: the actuator means includes a plurality of pawls, at least one of said pawls having a radially inwardly directed tootH having a rear face engageable with the control member to hold the control member in a fixed position, the remainder of said pawls having forward faces engageable with the control member to hold the control member in different fixed positions, and means for pivotally mounting the pawls on the means for adjusting the position of the actuator means.

11. The apparatus of claim 1 wherein: the power transmission means includes a first gear connected to the clutch mechanism and a second gear connected to the means for holding the armature and means drivably connecting the first gear with the second gear, said first gear having a different number of teeth than the number of teeth on said second gear.

12. The apparatus of claim 11 wherein: the number of teeth on the first gear is greater than the number of teeth on the second gear.

13. The apparatus of claim 11 wherein: the number of teeth on the first gear is less than the number of teeth on the second gear.

14. The apparatus of claim 11 wherein: the means drivably connecting the first gear with the second gear is an idler gear in driving engagement with the first and second gears.

15. An incremental rotation control apparatus comprising: a clutch mechanism having a power input member, a power output member, clutching means operable to drivably connect the input member with the output member, and a control member operable to control the operation of the clutching means, said control member being movable with the input member when the clutching means transmits power to the output member and held in a fixed position when the clutching means does not transmit power to the output member; actuator means engageable with the control member to hold the control member in a fixed position to thereby release the drive to the output member and releasable from the control member to allow the control member to move with the input member, support means for supporting the actuator means, said support means being movable to selected adjusted positions, and means for adjusting the position of the support means relative to the control member to adjust the location of the actuator means relative to the control member thereby adjusting the position in which the control member is held.

16. The apparatus of claim 15 wherein: the control member is a sleeve having a stop tooth, said actuator means including a movable member engageable with said tooth, and power means operable to selectively move the movable member out of and into engagement with said tooth.

17. The apparatus of claim 15 wherein: the actuator means includes a plurality of pawls engageable with the control member to selectively hold the control member in a plurality of fixed positions, pivot means mounted on the support means pivotally mounting the pawls, and power means operable to selectively pivot the pawls into and out of engagement with the control member whereby the control member sequentially moves between selected fixed positions of the control member.

18. The apparatus of claim 17 wherein: the support means includes plate means for supporting the pivot means and power means, and means for adjusting the position of the plate means whereby the positions of the pawls are adjusted relative to the control member.

19. The apparatus of claim 18 including: a stationary support, said means for adjusting the position of the plate means including releasable connecting means attaching the plate means to the support.

20. The apparatus of claim 19 wherein: the support has a groove, said plate means having a projection extended into the groove to position the plate means on the support.

21. The apparatus of claim 15 wherein: the actuator means includes three pivotally movable pawls selectively engageable with the control member to hold the control member in selected fixed positions, pivot means mounted on the support means supporting the pawl, separate power means connected to the pawl, said support means including separate plate means carrying the pivot means and power means, and means for adjusting the position of each plate means whereby the positions of the pawls are adjusted relative to the control member so that the control member can be stopped at selected fixed positions.

22. The apparatus of claim 21 including: a stationary support, said means for adjusting the position of each plate means including releasable connecting means attaching each plate means to the support.

23. The apparatus of claim 22 wherein: the support has a groove, each plate means having a projection extended into the groove to position each plate means on the support.

24. An incremental rotation control apparatus comprising: a clutch mechanism having a power input member, a power output member, clutching means operable to drivably connect the input member with the output member, and a control member operable to control the operation of the clutching means, said control member being movable with the input member when the clutching means transmits power to the output member and held in a fixed position when the clutching means does not transmit power to the output member; actuator means engageable with the control member to hold the control member in a fixed position to thereby release the drive to the output member, said actuator means including a plurality of pawls, at least one of said pawls having a radially inwardly directed tooth having a rear face engageable with the control member to hold the control member in a fixed position, the remainder of said pawls having forward faces selectively engageable with the control member to hold the control member in different fixed positions, means for adjusting the position of the actuator means relative to the control member to adjust the position in which the control member is held, and means for pivotally mounting the pawls on the means for adjusting the position of the actuator means.

25. The apparatus of claim 24 wherein: the means for adjusting the position of the actuator means includes plate means for supporting the pivot meanst, a fixed support, and fastening means for connecting the plate means to the fixed support.

26. The apparatus of claim 25 wherein: said plate means has arcuate slots for accommodating the fastening means for attaching the plate means to the support, said plate means being arcuately adjustable along the length of said slots.

27. An apparatus for indexing an armature comprising: a clutch mechanism, drive means for transmitting power to the clutch mechanism, means for holding an armature in a selected rotational position, power transmitting means drivably connecting the clutch mechanism to the means for holding the armature whereby operation of the clutch mechanism will rotate the armature to a selected position, said power transmitting means including a first gear connected to the cluch mechanism and a second gear connected to the means for holding an armature, and means drivably connecting the first gear with the second gear, said clutch mechanism having a control means operable to release the drive of the clutch mechanism to thereby hold the armature in a selected position, and means to release the control means whereby the clutch mechanism is engaged to transmit power to the power transmitting means which in turn rotates the armature until the clutch mechanism is released.

28. The apparatus of claim 27 wherein: the first gear has a diferent number of teeth than the number of teeth on the second gear.

29. The apparatus of claim 27 wherein: the number of teeth on the first gear is greater than the number of teeth on the second gear.

30. The apparatus of claim 27 wherein: the number of teeth on the first gear is less than the number of teeth on the second gear.

31. The apparatus of claim 27 wherein: the means drivably connecting the first gear with the second gear is an idler gear in driving engagement with the first and second gears.

32. An apparatus for indexing an armature comprising: a clutch mechanism, drive means for transmitting power to the clutch mechanism, means for holding an armature in a selected rotational position, power transmitting means drivably connecting the clutch mechanism to the means for holding the armature whereby operation of the clutch mechanism will rotate the armature to a selected position, said clutch mechanism having a control member which can be held in selected fixed positions to release the drive of the clutch mechanism to thereby hold the armature in selected positions, actuator means engageable with the control member to hold the control member in selected fixed positions, said actuator means including a plurality of pawls, at least one of said pawls having a radially inwardly directed tooth having a rear face engageable with the control member to hold the control member in a fixed position, the remainder of said pawls having forward faces engageable with the control member to hold the control member in different fixed positions, means for adjusting the position of the actuator means relative to the control member to adjust the selected fixed position in which the control member is held, and means for pivotally mounting the pawls on the means for adjusting the position of the actuator means.

33. The apparatus of claim 32 wherein: the actuator means includes power means connected to each of said pawls operable to selectively pivot the pawls into and out of engagement with the control member.

34. The apparatus of claim 32 wherein: the means for adjusting the position of the actuator means includes plate means for supporting the means for pivotally mounting the pawl and means for adjusting the position of the plate means whereby the positions of the pawls are adjusted relative to the control member.

35. The apparatus of claim 34 including: a stationary support, said means for adjusting the position of the plate means including releasable connecting means attaching the plate means to the support.

36. The apparatus of claim 35 wherein: the support means has a groove, and said plate means has a projection extended into the groove to position the plate means on the support.

37. The apparatus of claim 32 wherein: the power transmission means includes a first gear connected to the clutch mechanism and a second gear connected to the means for holding the armature and means drivably connecting the first gear with the second gear, said first gear having a different number of teeth than the number of teeth on said second gear.

38. The apparatus of claim 37 wherein: the number of teeth on the first gear is greater than the number of teeth on the second gear.

39. The apparatus of claim 37 wherein: the number of teeth on the first gear is less than the number of teeth on the second gear.

40. The apparatus of claim 37 wherein: the means drivably connecting the first gear with the second gear is an idler gear in driving engagement with the first and second gears.

41. An apparatus for indexing an armature comprising: a clutch mechanism having a power input member, a power output member, clutching means operable to drivably connect the input member with the output member, and a control member operable to control the operation of the clutching means, said control member being movable with the input member when the clutching means transmits power to the output member and held in a fixed position when the clutching means does not transmit power to the output member, drive means for transmitting power to the input member, means for holding an armature in a selected rotational position, power transmitting means drivably connecting the output member to the means for holding the armature whereby operation of the clutch mechanism will rotate the armature to a selected position, actuator means engageable with the control member to hold the control member in selected fixed positions, said actuator means including a plurality of pawls, each of said pawls having a portion engageable with the control member to hold the control member in a fixed position, a support, means for pivotally mounting each pawl on the support, and means for pivotally moving the pawls into holding positions relative to the control member.

42. The apparatus of claim 41 wherein: the means for pivotally moving the pawls includes power means connected to each of said pawls operable to selectively pivot the pawls into and out of engagement with the control member.

43. The apparatus of claim 41 wherein: the power transmission means includes a first gear connected to the output member and a second gear connected to the means for holding the armature and means drivably connecting the first gear with the second gear, said first gear having a different number of teeth than the number of teeth on said second gear.

44. The apparatus of claim 41 wherein: the number of teeth on the first gear is greater than the number of teeth on the second gear.

45. The apparatus of claim 41 wherein: the number of teeth on the first gear is less than the number of teeth on the second gear.

46. The apparatus of claim 41 wherein: the means drivably connecting the first gear with the second gear is an idler gear in driving engagement with the first and second gears.

* * * * *

UNITED STATES PATENT AND TRADEMARK OFFICE
CERTIFICATE OF CORRECTION

PATENT NO. : 3,979,975
DATED : September 14, 1976
INVENTOR(S) : David A. Schulman It is certified that error appears in the above-identified patent and that said Letters Patent are hereby corrected as shown below:

Column 3, line 55, "has" should be --can--.

Column 4, line 15, "menas" should be --means--.

Column 4, line 24, "in" should be --is--.

Column 5, line 26, "paws" should be --pawls--.

Column 9, line 5, "meanst" should be --means--.

Signed and Sealed this

Twenty-ninth Day of March 1977

[SEAL]

Attest:

RUTH C. MASON
Attesting Officer

C. MARSHALL DANN
Commissioner of Patents and Trademarks